June 6, 1950     H. R. MURPHY     2,510,596

BATTERY CARRIER

Filed Aug. 24, 1948

Hugh R. Murphy
INVENTOR.

BY *Clarence A. O'Brien*
*and Harvey B. Jacobson*
Attorneys

Patented June 6, 1950

2,510,596

UNITED STATES PATENT OFFICE 2,510,596

BATTERY CARRIER

Hugh R. Murphy, Troy, N. Y.

Application August 24, 1948, Serial No. 45,874

2 Claims. (Cl. 224—45)

This invention relates to new and useful improvements in article handling and carrying devices and the primary object of the present invention is to provide a carrier for batteries.

Another important object of the present invention is to provide a battery carrier that is adjustable to accommodate batteries of various sizes and which is quickly and readily applied to or removed from a battery in a convenient manner to facilitate the safe handling of a battery.

A further object of the present invention is to provide a battery carrier including a pair of slidably adjustable members and embodying gripping jaws for engaging the recesses in the ends of a battery without in any way chipping or defacing the said battery during the carrying thereof.

A still further aim of the present invention is to provide a battery carrier of the aforementioned character that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
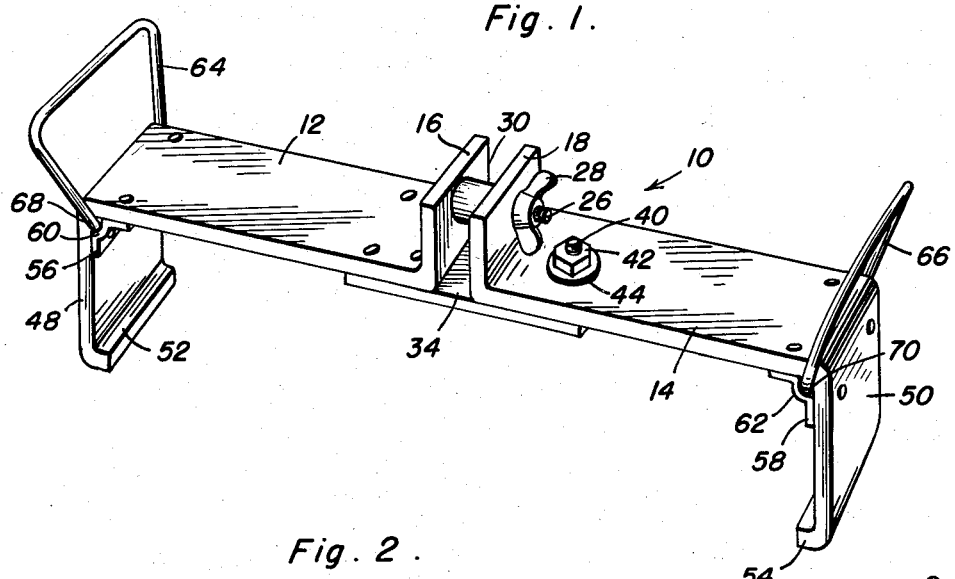
Figure 1 is a perspective view of the present battery carrier.

Referring now to the drawings in detail, wherein for the purpose of illustration, there is disclosed a preferred embodiment of the present invention, the numeral 10 represents the present battery carrier generally, including a pair of elongated, substantially rectangular members 12 and 14 having angulated inner end portions 16 and 18.

The end portions 16 and 18 are provided with opposed, central openings 20 and 22 through which there extends a bolt 24 having a head portion 26 that bears against the outer surface of the end portion 16. The externally threaded end of the bolt 24 receivably engages a nut 28, preferably of the wing-type for adjustably connecting the said end portions 16 and 18, and a spacing collar or sleeve 30 embraces the bolt 24 and is disposed between the end portions 16 and 18 to limit the movement of the end portions toward each other.

Rigidly secured to the lower or inner face of the member 12, adjacent the end portion 16 thereof, by rivets or the like 32, is one end of an elongated retainer plate 34. The free end of the plate 34 is provided with a longitudinal slot or opening 36 that opposes an aperture 38 formed in the member 14, adjacent the end portion 18.

A headed bolt 40 extends through the slot 36 and apertures 38 and the threaded end of the bolt 40 receivably engages a nut 42. A washer 44 slidable on the bolt 40 is clamped against the upper or outer face of the member 14 by the nut 42. A further washer 46 carried by the bolt 40 bears against the lower or inner face of the plate 34.

Integrally formed with or rigidly attached to the outer ends of the members 12 and 14, is a pair of jaws 48 and 50 which are perpendicular to the members 12 and 14 and on the opposite sides thereof from the end portions 16 and 18. The outer extremities of the jaws 48 and 50 are turned inwardly to provide gripping flanges 52 and 54.

Secured to the inner faces of the jaws 48 and 50, and the members 12 and 14, are the legs of a pair of substantially V-shaped brackets 56 and 58 having arcuate central portions 60 and 62.

A pair of hand grips 64 and 66 having lower rails 68 and 70 are clamped between the central portions of the brackets 56 and 58 and the juncture of the jaws 48 and 50 with the members 12 and 14 for pivotal movement.

Figure 2:
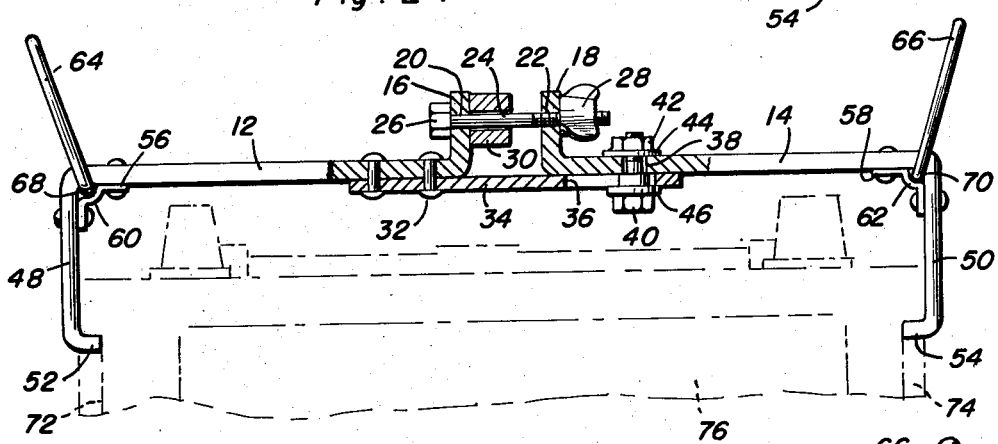
Figure 2 is a side elevational view showing the present invention applied to a battery (dotted lines), and with parts of the present carrier broken away and shown in section.
Figure 3:
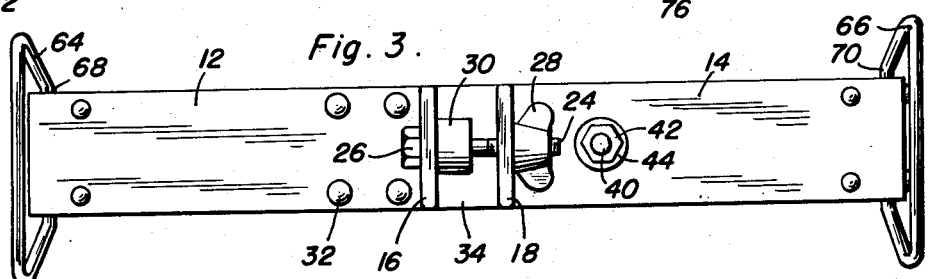
Figure 3 is a top plan view of the present invention.

In practical use of the present invention, the bolt 42 is adjusted for retaining the end portions 16 and 18 spaced at a predetermined distance with the flanges 52 and 54 engaged in recesses 72 and 74 in the ends of a battery 76 (see Figure 2). The grips 64 and 66 are then held by the hands of a user to permit the battery 76 to be carried and handled in a convenient manner.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same Having described the invention, what is claimed as new is:

1. A battery carrier comprising a pair of members having inner and outer end portions, means adjustably connecting the inner end portions of said members, means preventing endwise movement of said members relative to each other and joining the inner end portions of said members together, and jaws at the outer end portions of said members for gripping a battery, said means preventing endwise movement of said members relative to each other including an elongated plate fixed at one end to one of said members, the free end of said plate bearing against the remaining of said members, and means slidably and adjustably securing the free end of said plate to said remaining of said members.

2. A battery carrier comprising first and second elongated substantially L-shaped members, means adjustably connecting the shorter legs of said members, a retainer plate fixed at one end to said first member, the free end of said plate bearing against the longer leg of said second member and having a slot, the longer leg of said second member having an aperture in registry with said slot, a fastener securing said second member to the free end of said plate, said fastener being slidably received in said slot and extending through said slot and said aperture, angulated gripping jaws integrally formed with the longer legs of said members, and hand grips at the juncture of said jaws with said members.

HUGH R. MURPHY.

REFERENCES CITED

The following references are of record in the file of this patent:

UNITED STATES PATENTS

| Number | Name | Date |
|---|---|---|
| 1,489,112 | Bowles | Apr. 1, 1924 |
| 2,169,119 | Blum | Aug. 9, 1939 |